United States Patent
Rejman et al.

(10) Patent No.: US 8,945,748 B2
(45) Date of Patent: Feb. 3, 2015

(54) BATTERY PACK

(75) Inventors: Marcin Rejman, Waiblingen (DE); Wolf Matthias, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1086 days.

(21) Appl. No.: 11/570,285

(22) PCT Filed: Jul. 1, 2005

(86) PCT No.: PCT/EP2005/053140
§ 371 (c)(1),
(2), (4) Date: Dec. 8, 2006

(87) PCT Pub. No.: WO2006/027282
PCT Pub. Date: Mar. 16, 2006

(65) Prior Publication Data
US 2007/0259261 A1    Nov. 8, 2007

(30) Foreign Application Priority Data
Sep. 10, 2004    (DE) .......................... 10 2004 043 829

(51) Int. Cl.
*H01M 10/50*    (2006.01)
*H01M 10/617*    (2014.01)
*H01M 2/34*    (2006.01)
*H01M 10/6235*    (2014.01)
*H01M 10/643*    (2014.01)
*H01M 10/653*    (2014.01)
*H01M 10/6555*    (2014.01)
(Continued)

(52) U.S. Cl.
CPC .......... *H01M 10/5008* (2013.01); *H01M 2/348* (2013.01); *H01M 10/5014* (2013.01); *H01M 10/503* (2013.01); *H01M 10/504* (2013.01); *H01M 10/5055* (2013.01); *H01M 2/022* (2013.01); *H01M 6/42* (2013.01); *H01M 2200/10* (2013.01)
USPC ........................................................ 429/120

(58) Field of Classification Search
USPC ........................................................ 429/120
See application file for complete search history.

(56) References Cited

U.S. PATENT DOCUMENTS

| 3,999,110 | A | | 12/1976 | Ramstrom et al. |
| 4,007,315 | A | * | 2/1977 | Brinkmann et al. ............ 429/62 |
| 5,227,263 | A | | 7/1993 | Blier |

(Continued)

FOREIGN PATENT DOCUMENTS

| CN | 2300054 | 12/1998 |
| DE | 101 06 810 | 9/2002 |

(Continued)

OTHER PUBLICATIONS

Marks Standard Handbook for Mechanical Engineers, 1998, Elsevier, Twelfth Edition—Table 7.60—Properties of Typical Commodity Thermo Plastics.

(Continued)

*Primary Examiner* — Muhammad Siddiquee
(74) *Attorney, Agent, or Firm* — Kenyon & Kenyon LLP

(57) ABSTRACT

The invention relates to a battery pack (2) for supplying an electrical appliance or an electromobile, especially a power tool, with power. Said battery pack comprises a plurality of battery cells (4) and at least one heat compensation element (18) interposed between neighboring battery cells (4). The invention is characterized in that the heat compensation element (18) consists of a plastic material.

31 Claims, 1 Drawing Sheet

(51) Int. Cl.
*H01M 2/02* (2006.01)
*H01M 6/42* (2006.01)

(56) References Cited

U.S. PATENT DOCUMENTS

| | | | |
|---|---|---|---|
| 5,227,264 | A | 7/1993 | Duval et al. |
| 5,338,624 | A | 8/1994 | Gruenstern et al. |
| 5,552,240 | A | 9/1996 | Derstine |
| 5,626,982 | A * | 5/1997 | Kawai et al. ............... 429/120 |
| 5,665,443 | A | 9/1997 | Hata et al. |
| 6,306,957 | B1 | 10/2001 | Nakano et al. |
| 6,428,925 | B1 | 8/2002 | Takeno et al. |
| 6,656,626 | B1 | 12/2003 | Mooty et al. |
| 6,692,864 | B1 * | 2/2004 | Dansui et al. ............... 429/120 |
| 6,758,868 | B2 | 7/2004 | Munshi |
| 6,849,357 | B1 * | 2/2005 | Kasahara et al. ........... 429/163 |
| 6,861,821 | B2 | 3/2005 | Masumoto et al. |
| 6,908,687 | B2 | 6/2005 | Mendes et al. |
| 7,153,906 | B2 | 12/2006 | Akiyama et al. |
| 2002/0022179 | A1 * | 2/2002 | Yuasa et al. ............... 429/163 |
| 2002/0125860 | A1 * | 9/2002 | Schworm et al. .......... 320/150 |
| 2003/0026063 | A1 | 2/2003 | Munshi |
| 2003/0034274 | A1 | 2/2003 | Morita et al. |
| 2003/0180582 | A1 | 9/2003 | Masumoto et al. |
| 2003/0207993 | A1 | 11/2003 | Akiyama et al. |
| 2005/0005629 | A1 * | 1/2005 | Zhao et al. ................ 62/392 |
| 2005/0233206 | A1 | 10/2005 | Puttalah et al. |

FOREIGN PATENT DOCUMENTS

| | | |
|---|---|---|
| EP | 0975031 | 1/2000 |
| GB | 251118 | 6/1992 |
| JP | 2001036822 | 2/2001 |
| JP | 2003036821 | 2/2003 |
| JP | 2004245725 | 9/2004 |
| JP | 2004246159 | 9/2004 |
| WO | 01/03231 | 1/2001 |
| WO | 02/03484 | 1/2002 |
| WO | 03/083961 | 10/2003 |

OTHER PUBLICATIONS

Felder et al., Elementary Principles of Chemical Processes, 1986, John Wiley & Sons, Inc., Second Edition, pp. 43-44.

* cited by examiner

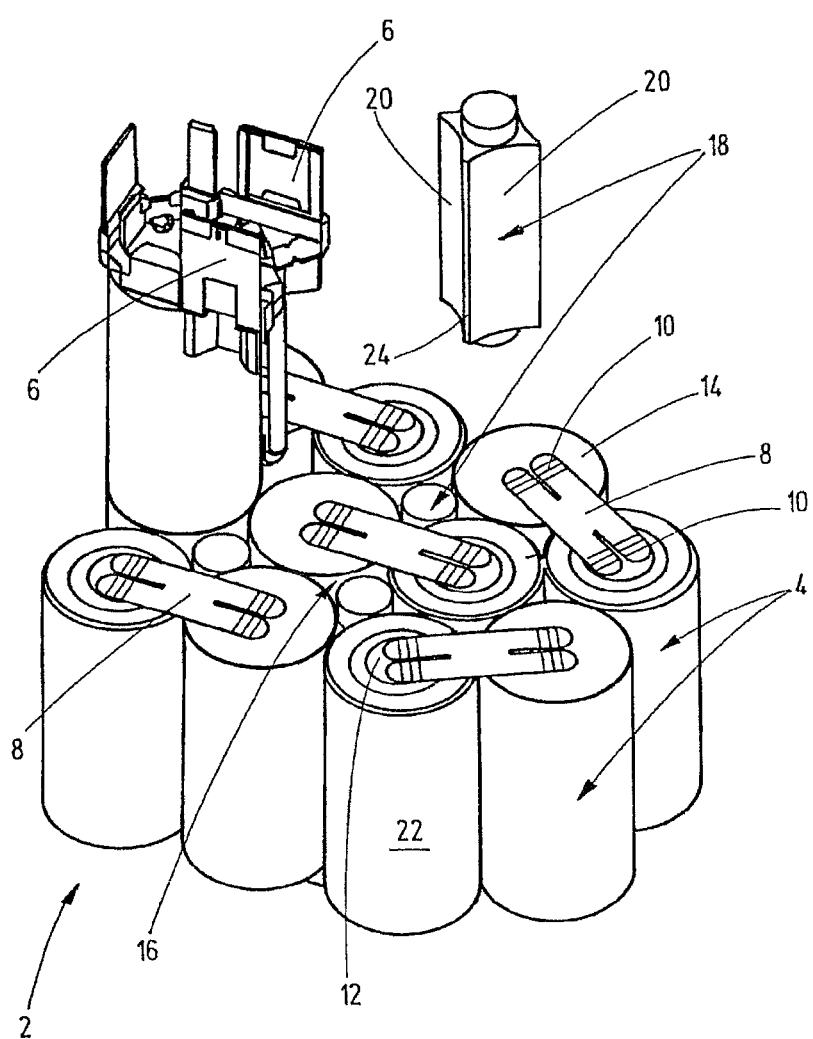

BATTERY PACK

The invention relates to a battery pack for supplying current to an electric device or an electric vehicle, in particular an electric power tool, as generically defined by the preamble to claim 1; the terms battery cell and battery pack employed are intended also to include rechargeable current-storing means (rechargeable batteries, known as accus) or accu packs.

PRIOR ART

Battery packs for supplying current to electric power tools or other electric devices heat up during operation, because of high useful currents. Particularly whenever some of the battery cells of the battery pack have no direct contact with an outer wall of a housing of the battery pack, the cooling of these inner cells is poorer than that of the cells adjacent to the outer wall, since because of a power conversion in these last-named cells, lost heat can be radiated more easily through the housing wall to the environment. Because of the uneven cooling, the inner and outer cells can have different efficiencies, which in turn can lead to debalancing, or in other words unequal load states of the cells, and hence to overheating of individual cells.

As a provision for making the temperature distribution among the cells of a battery pack uniform, it is already known to locate metal heat equalization elements in the interstices between adjacent cells, and these elements assure better heat equalization among the cells. These heat equalization elements are preferably formed by aluminum bodies, which combine both excellent thermal conductivity with a relatively low specific weight. However, these metal heat equalization elements have the disadvantage that there are electrically conductive bodies in the interstices between cells, which as a consequence of vibration or impacts may come into contact with current-carrying cell connectors that span the interstices and can cause short-circuits between them. To prevent this, a very secure support of the heat equalization elements in the housing is necessary. However, for instance from damage caused by vibration or impact to the insulation, typically of paper, between adjacent cells, short circuits can come about via the heat equalization elements. Furthermore, even heat equalization elements made from aluminum have a not inconsiderable weight, which disadvantageously makes itself felt particularly in portable electric devices and especially handheld electric power tools.

ADVANTAGES OF THE INVENTION

By comparison, the battery pack of the invention, having the characteristics recited in claim 1, offers the advantage that the heat equalization elements, made from a plastic material, are lighter in weight, electrically insulating, and moreover less expensive, compared to metal heat equalization elements. Moreover, plastic materials in general are softer than metals and therefore better conform to the circumferential surfaces of the cells. If thermoplastics are used, the heat equalization elements can furthermore be produced as molded parts by injecting molding or extrusion, and as a result, besides very economical production, a cross-sectional shape that is optimally adapted to the cross-sectional shape of the interstices between the cells can be achieved. Moreover, plastics as a rule have a higher coefficient of thermal expansion than metals, so that upon heating of the cells, they expand more markedly and thus conform even better to the cells, so that precisely when needed, namely in the event of major heat production, an improved heat transfer can be achieved. Last but not least, by producing the heat equalization elements from plastic, it will become possible in future to embody the battery cells themselves without their own insulation, the task of which is then taken over by the plastic heat equalization elements. With the insulation of the cells, a further bottleneck in heat transfer can be eliminated, and the potential for heat equalization can be improved still further.

A preferred feature of the invention provides that as the plastic material for producing the heat equalization elements, a thermoplastic polyolefin, preferably a polyethylene, and most preferably high-density polyethylene (PE-HD) is used, since the thermal conductivity of this last substance, with a value of approximately 0.40 to 0.42 W/mK, reaches the range of the maximum internal thermal conductivity of most cells. As has been demonstrated by computer and by tests, the range of maximum or limit thermal conductivity in the interior of battery cells is as a rule approximately 0.4 to 0.5 W/mK, so that a thermal conductivity of the heat equalization elements that goes beyond this range of values has no significant advantages in terms of heat dissipation.

A further preferred feature of the invention therefore provides that the heat equalization elements, depending on the type of battery cells used, have a thermal conductivity of more than 0.3 W/mK and preferably of 0.4 to 0.5 W/mK; if needed, a somewhat lower thermal conductivity of the plastic used as the basic material can be increased by providing that fillers in the form of mineral or metal particles, such as aluminum oxide or aluminum, are added to the plastic during manufacture, the particle size expediently being less than 20 μm and preferably less than 10 μm.

In another preferred alternative of the invention, the heat equalization element may also comprise an elastomeric plastic material, which conforms even better than thermoplastics to the circumferential faces of the battery cells and thus not only improves the heat transfer but simultaneously also makes it easier to introduce the cells and assures excellent vibration damping of the cells.

Preferably, moreover not only is the material of the heat equalization element selected such that it presses in form-locking fashion against the circumferential faces of the battery cells and brings about an equalization of tolerances, but its cross section is also selected such that over at least a portion of its length and expediently over the great majority of its length, it is complementary to the cross section of the interstice between the cells, so that it essentially completely fills up these interstices. Adjacent to one or both of its face ends, however, the heat equalization element may have a smaller cross section, in order to prevent contact with one of the cell connectors that span the interstice.

DRAWING

The invention will be described in further detail below in an exemplary embodiment in conjunction with the associated drawing.

FIG. 1 is a partly exploded perspective view of a part of a battery pack without a housing.

DESCRIPTION OF THE EXEMPLARY EMBODIMENT

The battery pack 2 shown in a drawing without a housing serves as a power supply for an electric device, such as a handheld electric power tool (not shown). It essentially comprises the housing (not shown), made from a plastic material; one or more layers (shown only in part) of battery cells 4, located singly side by side in the housing; and a closure (not shown), which closes the housing on the face end of the uppermost layer of cells 4. The closure, as a rule formed by a part of the electric device, includes two contacts, which upon closure of the housing come into contact with terminal contacts 6 of the battery pack 2, in order to connect the cells 4, accommodated in the housing and connected in series or parallel, to a current circuit of the consumer of the electric device.

The battery pack 2 shown contains a total of eleven cylindrical battery cells 4 in one layer; some of these are located in a looser square package and others in a tighter triangular package; in the first instance the center axes of four adjacent cells 4 form the corners of a square, while in the latter instance the center axes of three adjacent cells 4 form the corners of an equilateral triangle. Above the upper face ends of the cells 4, a roll of H-shaped cell connectors 8 made from an electrically conductive sheet metal is located; these connectors each connect two adjacent cells 4 in series with one another, and their free legs 10 are placed in pairs in contact with contact faces 12, 14 on the face ends of opposite polarity of these cells 4.

In order for the lost heat, released upon the power conversion in the inner battery cells 4 of each layer that are farther away from the housing, to be dissipated to the environment faster and to improve the cooling of these cells 4, heat equalization elements 18 are located in each of the nips 16 between the cells 4 of each layer that are located in the square pack; these heat equalization elements make the heat distribution among the cells 4 uniform, making it possible to prevent unequal efficiencies among the cells 4 in one layer and hence debalancing of the cells.

The heat equalization elements 18 have a length corresponding to the length of the cells 4, and over the majority of their length, they have a cross section that is adapted to the shape of the nip 16 between the cells 4. In the region of this adapted cross section, the heat equalization elements 18 are bounded essentially by four concave, partly cylindrical side faces 20, whose radii of curvature correspond to the radius of curvature of the cylindrical circumferential faces 22 of the cells 4. To prevent damage to the insulation of the cells 4 from sharp edges between the adjacent side faces 20, these side faces are separated from one another on their edges toward one another by narrow end faces 24, which furthermore may be somewhat rounded. Adjacent to their upper and lower face ends, the heat equalization elements 18 have a smaller cylindrical cross section, so that there they maintain an adequate lateral spacing from the cell connectors 8. This prevents an impairment, for instance in the event of an axial shifting of a heat equalization element 18 caused by a foreign body that has gotten between the cells 4, of the contact between an adjacent cell 4 and a cell connector 8 contacting it.

In the nips between the cells 4, arranged in a triangular pack, of each layer, there can also be heat equalization elements (not shown), whose cross section corresponds to the cross section of these nips.

The heat equalization elements 18 are produced as individual parts by injection molding from high-density polyethylene (PE-HD), whose thermal conductivity, at approximately 0.4 to 0.42 W/mK, has a value that is comparable to the thermal conductivity of the cells 4 themselves, which is 0.4 to 0.5 W/mK. Because of their production from polyethylene, which is electrically nonconducting, these heat equalization elements 18, even if damage occurs to the insulation of the cells 4, assure that short circuits will not occur between the cells 4. Furthermore, high-density polyethylene (PE-HD) has a relatively high modulus of elasticity of 1350 MPa in accordance with ISO 1183 and a coefficient of thermal expansion that is greater than that of metals, so that the heat equalization elements 18 made from this material, in the event of heating, metal heat equalization elements expand to a greater extent and press closely against the adjacent cells 4. In the process, any small air gaps that may be present between the side faces 20 of the heat equalization elements 18, which faces contact the circumferential faces 22 of the cells 4, are closed, and thus the heat transfer from the cells 4 into the heat equalization elements 18 is improved, especially whenever that is the most necessary in order to avoid overheating or debalancing of the cells 4.

The invention claimed is:

1. A battery pack for supplying current to an electric device, comprising:
   a plurality of battery cells; and
   at least one heat equalization element, located in an interstice between adjacent ones of the plurality of battery cells;
   wherein the at least one heat equalization element includes a plastic material having a thermal conductivity which is in the range of the maximum internal thermal conductivity of the plurality of battery cells,
   wherein the at least one heat equalization element does not include metal and is electrically nonconducting, and
   wherein the at least one heat equalization element, when heated, expands to press closely against adjacent ones of the plurality of battery cells, so that air gaps present between side faces of the at least one heat equalization element, whose faces contact circumferential faces of the battery cells are close, so as to improve heat transfer from the battery cells into the at least one heat equalization element to avoid overheating or debalancing of the battery cells; and wherein the at least one heat equalization element includes a plurality of heat equalization elements, each having a length corresponding to a length of the battery cells, and over a majority of the length, the cross-section is adapted to a shape of a nip between the battery cells, and wherein in a region of the adapted cross-section, the heat equalization elements are bounded essentially by four concave, partly cylindrical side faces, whose radii of curvature correspond to a radius of curvature of cylindrical circumferential faces of the battery cells.

2. The battery pack of claim 1, wherein the plastic material is a polyolefin.

3. The battery pack of claim 2, wherein the plastic material is a polyethylene.

4. The battery pack of claim 3, wherein the plastic material is a high-density polyethylene (PE-HD).

5. The battery pack of claim 1, wherein the heat equalization element includes an elastomeric plastic material.

6. The battery pack of claim 1, wherein the heat equalization element includes a plastically deformable plastic material.

7. The battery pack of claim 1, wherein the plastic material forms a potting composition.

8. The battery pack of claim 1, wherein the plastic material has a thermal conductivity of more than 0.3 W/mK.

9. The battery pack of claim 1, wherein the plastic material includes at least one filler.

10. The battery pack of claim 1, wherein the heat equalization element, over at least a portion of its length, has a cross section that is complementary to a cross section of the interstice between the adjacent ones of the plurality of battery cells.

11. The battery pack of claim 1, wherein the electric device is an electric vehicle.

12. The battery pack of claim 1, wherein the electric device is an electric power tool.

13. The battery pack of claim 1, wherein the plastic material has a thermal conductivity of 0.4 W/mK to 0.5 W/mK.

14. The battery pack of claim 1, wherein the plastic material is a polyolefin, and wherein the heat equalization element includes an elastomeric plastic material.

15. The battery pack of claim 14, wherein the plastic material forms a potting composition, wherein the plastic material has a thermal conductivity of more than 0.3 W/mK, and wherein the plastic material includes at least one filler.

16. The battery pack of claim 1, wherein the plastic material is a polyethylene, and wherein the heat equalization element includes an elastomeric plastic material.

17. The battery pack of claim 16, wherein the plastic material forms a potting composition, wherein the plastic material has a thermal conductivity of more than 0.3 W/mK, and wherein the plastic material includes at least one filler.

18. The battery pack of claim 1, wherein the plastic material is a high-density polyethylene (PE-HD), and wherein the heat equalization element includes an elastomeric plastic material.

19. The battery pack of claim 18, wherein the plastic material forms a potting composition, wherein the plastic material has a thermal conductivity of more than 0.3 W/mK, and wherein the plastic material includes at least one filler.

20. The battery pack of claim 1, wherein the plastic material is a polyolefin, and wherein the heat equalization element includes a plastically deformable plastic material.

21. The battery pack of claim 20, wherein the plastic material forms a potting composition, wherein the plastic material has a thermal conductivity of more than 0.3 W/mK, and wherein the plastic material includes at least one filler.

22. The battery pack of claim 1, wherein the plastic material is a polyethylene, and wherein the heat equalization element includes a plastically deformable plastic material.

23. The battery pack of claim 22, wherein the plastic material forms a potting composition, wherein the plastic material has a thermal conductivity of more than 0.3 W/mK, and wherein the plastic material includes at least one filler.

24. The battery pack of claim 1, wherein the plastic material is a high-density polyethylene (PE-HD), and wherein the heat equalization element includes a plastically deformable plastic material.

25. The battery pack of claim 24, wherein the plastic material forms a potting composition, wherein the plastic material has a thermal conductivity of more than 0.3 W/mK, and wherein the plastic material includes at least one filler.

26. The battery pack of claim 1, wherein the plastic material is a polyethylene, wherein the heat equalization element includes an elastomeric plastic material, wherein the plastic material forms a potting composition, wherein the heat equalization element, over at least a portion of its length, has a cross section that is complementary to a cross section of the interstice between the adjacent ones of the plurality of battery cells, wherein the plastic material has a thermal conductivity of 0.4 W/mK to 0.5 W/mK, and wherein the plastic material includes at least one filler.

27. The battery pack of claim 1, wherein the plastic material is a high-density polyethylene (PE-HD), wherein the heat equalization element includes an elastomeric plastic material, wherein the heat equalization element, over at least a portion of its length, has a cross section that is complementary to a cross section of the interstice between the adjacent ones of the plurality of battery cells, wherein the plastic material has a thermal conductivity of 0.4 W/mK to 0.5 W/mK, and wherein the plastic material includes at least one filler.

28. The battery pack of claim 1, wherein the plastic material is a polyolefin, wherein the heat equalization element includes a plastically deformable plastic material, wherein the plastic material forms a potting composition, wherein the heat equalization element, over at least a portion of its length, has a cross section that is complementary to a cross section of the interstice between the adjacent ones of the plurality of battery cells, wherein the plastic material has a thermal conductivity of 0.4 W/mK to 0.5 W/mK, and wherein the plastic material includes at least one filler.

29. The battery pack of claim 1, wherein the plastic material is a polyethylene, wherein the heat equalization element includes a plastically deformable plastic material, wherein the plastic material forms a potting composition, wherein the heat equalization element, over at least a portion of its length, has a cross section that is complementary to a cross section of the interstice between the adjacent ones of the plurality of battery cells, wherein the plastic material has a thermal conductivity of 0.4 W/mK to 0.5 W/mK, and wherein the plastic material includes at least one filler.

30. The battery pack of claim 1, wherein the plastic material is a high-density polyethylene (PE-HD), wherein the heat equalization element includes a plastically deformable plastic material, wherein the heat equalization element, over at least a portion of its length, has a cross section that is complementary to a cross section of the interstice between the adjacent ones of the plurality of battery cells, wherein the plastic material has a thermal conductivity of 0.4 W/mK to 0.5 W/mK, and wherein the plastic material includes at least one filler.

31. The battery pack of claim 1, wherein the at least one heat equalization element has a length corresponding to a length of the battery cell, and wherein adjacent to at least one end face of the equalization element there is a smaller cross-section so as to maintain an adequate lateral spacing from a cell connector.

* * * * *